US012595137B2

(12) United States Patent
Priero

(10) Patent No.: US 12,595,137 B2
(45) Date of Patent: Apr. 7, 2026

(54) APPARATUS FOR TRANSFERRING AND ACCUMULATING OBJECTS AND PACKAGING LINE COMPRISING SAID APPARATUS

(71) Applicant: EUROPOOL—S.r.l., Fidenza (IT)

(72) Inventor: Marco Priero, Fidenza (IT)

(73) Assignee: EUROPOOL S.r.l., Fidenza (IT)

( * ) Notice: Subject to any disclaimer, the term of this patent is extended or adjusted under 35 U.S.C. 154(b) by 218 days.

(21) Appl. No.: 18/366,420

(22) Filed: Aug. 7, 2023

(65) Prior Publication Data

US 2024/0010443 A1 Jan. 11, 2024

Related U.S. Application Data

(63) Continuation of application No. PCT/IB2023/051544, filed on Feb. 20, 2023.

(51) Int. Cl.
B65G 47/26 (2006.01)
B65G 47/51 (2006.01)
(Continued)

(52) U.S. Cl.
CPC ....... B65G 47/265 (2013.01); B65G 47/5104 (2013.01); B65G 47/682 (2013.01); B65G 47/69 (2013.01)

(58) Field of Classification Search
USPC ...................................................... 198/374.4
See application file for complete search history.

(56) References Cited

U.S. PATENT DOCUMENTS 5,304,027 A * 4/1994 La Barre ................ B65G 29/02
414/787
6,543,600 B2 4/2003 Ouellette
(Continued)

FOREIGN PATENT DOCUMENTS

DE 102017211901 A1 1/2019
EP 3221240 11/2015
(Continued)

OTHER PUBLICATIONS

International Search Report and Written Opinion, as issued in connection with International Patent Application No. PCT/IB2023/051544, dated May 26, 2023.

*Primary Examiner* — William R Harp
(74) *Attorney, Agent, or Firm* — Maschoff Brennan; Paul G. Johnson

(57) ABSTRACT

An apparatus for transferring and accumulating objects. The apparatus includes at least a first group and a second group of accumulation channels parallel to each other. Each accumulation channel having an elongated extension along a direction parallel to an accumulation direction between a loading end and an unloading end of objects. The accumulation channels of the first group having the loading ends aligned with each other and the accumulation channels of the second group having the loading ends aligned with each other. The apparatus further includes at least a first and a second transfer device for transferring objects to said accumulation channels. The first and second transfer devices receive objects in an alternating manner and the loading ends of the accumulation channels of the first group are misaligned with respect to the loading ends of the accumulation channels of the second group.

13 Claims, 9 Drawing Sheets

(51) Int. Cl.
　　　*B65G 47/68*　　　　　(2006.01)
　　　*B65G 47/69*　　　　　(2006.01)

(56)　　　　　　　　References Cited

U.S. PATENT DOCUMENTS

| | | | | |
|---|---|---|---|---|
| 7,165,667 | B2 * | 1/2007 | Bocker | ................. B65G 47/71 |
| | | | | 198/442 |
| 12,168,578 | B2 * | 12/2024 | Azzali | ............... B65G 47/5104 |
| 12,291,405 | B2 * | 5/2025 | Seger | .................... B65G 47/71 |
| 2016/0130093 | A1 | 5/2016 | Hanselman | |

FOREIGN PATENT DOCUMENTS

| | | | |
|---|---|---|---|
| EP | 3401247 | A1 | 11/2018 |
| FR | 2988709 | A1 | 10/2013 |
| WO | 2014076390 | A1 | 5/2014 |
| WO | 2016080826 | A1 | 5/2016 |

* cited by examiner

APPARATUS FOR TRANSFERRING AND ACCUMULATING OBJECTS AND PACKAGING LINE COMPRISING SAID APPARATUS

TECHNICAL FIELD

The present invention relates to an apparatus for transferring and accumulating objects and a packaging line comprising such an apparatus. In particular, the objects may be bottles, containers or the like.

BACKGROUND

In production and packaging lines, for example between two successive workstations, the use of an accumulation table which acts as a buffer for the objects coming from the upstream station is known, in particular when jamming occurs upstream and/or during maintenance interventions. The use of an accumulation table therefore prevents having to stop the upstream station as well.

There are different accumulation table architectures and different accumulation logics on the market, tailored to the specific needs of the line.

For example, WO2014/076390 presents an accumulation table interposed between an input belt and an output belt, on which rows of objects are transferred and on which heads and/or manipulating robots adapted to move the rows on the table operate.

Feeding in rows can cause problems with the continuous operation of the system. In addition, the use of manipulating robots affects overall dimensions and increases the complexity of the line control logic.

Furthermore, some types of products, particularly delicate ones, require careful handling management.

Another solution of known type, described in EP3221240, shows an accumulator device for dynamically accumulating products in which two parallel conveyor belts are put in communication by a curvilinear guide movable along the belts. By moving the transfer device along the belts, it is possible to generate a certain space between two products so that products do not arrive downstream of the transfer device for a given time interval.

Such a device is used for small accumulation tables. As the size of the device increases, the speed and effort required accordingly increase, losing efficiency (i.e., lower hourly line yield).

SUMMARY

An apparatus for transferring and accumulating objects. The apparatus includes at least a first group and a second group of accumulation channels parallel to each other. Each accumulation channel having an elongated extension along a direction parallel to an accumulation direction between a loading end and an unloading end of objects. The accumulation channels of the first group having the loading ends aligned with each other and the accumulation channels of the second group having the loading ends aligned with each other. The apparatus further includes at least a first and a second transfer device for transferring objects to said accumulation channels. The first transfer device being configured to transfer objects only to accumulation channels of the first group. The second transfer device being configured to transfer objects only to accumulation channels of the second group. Additionally, the first and second transfer devices receive objects in an alternating manner and the loading ends of the accumulation channels of the first group are misaligned with respect to the loading ends of the accumulation channels of the second group.

BRIEF DESCRIPTION OF DRAWINGS

Further features and advantages will become more apparent from the following embodiment of an apparatus for transferring and accumulating objects and a packaging line, as illustrated in the appended drawings, in which.

DETAILED DESCRIPTION

Figure 1:
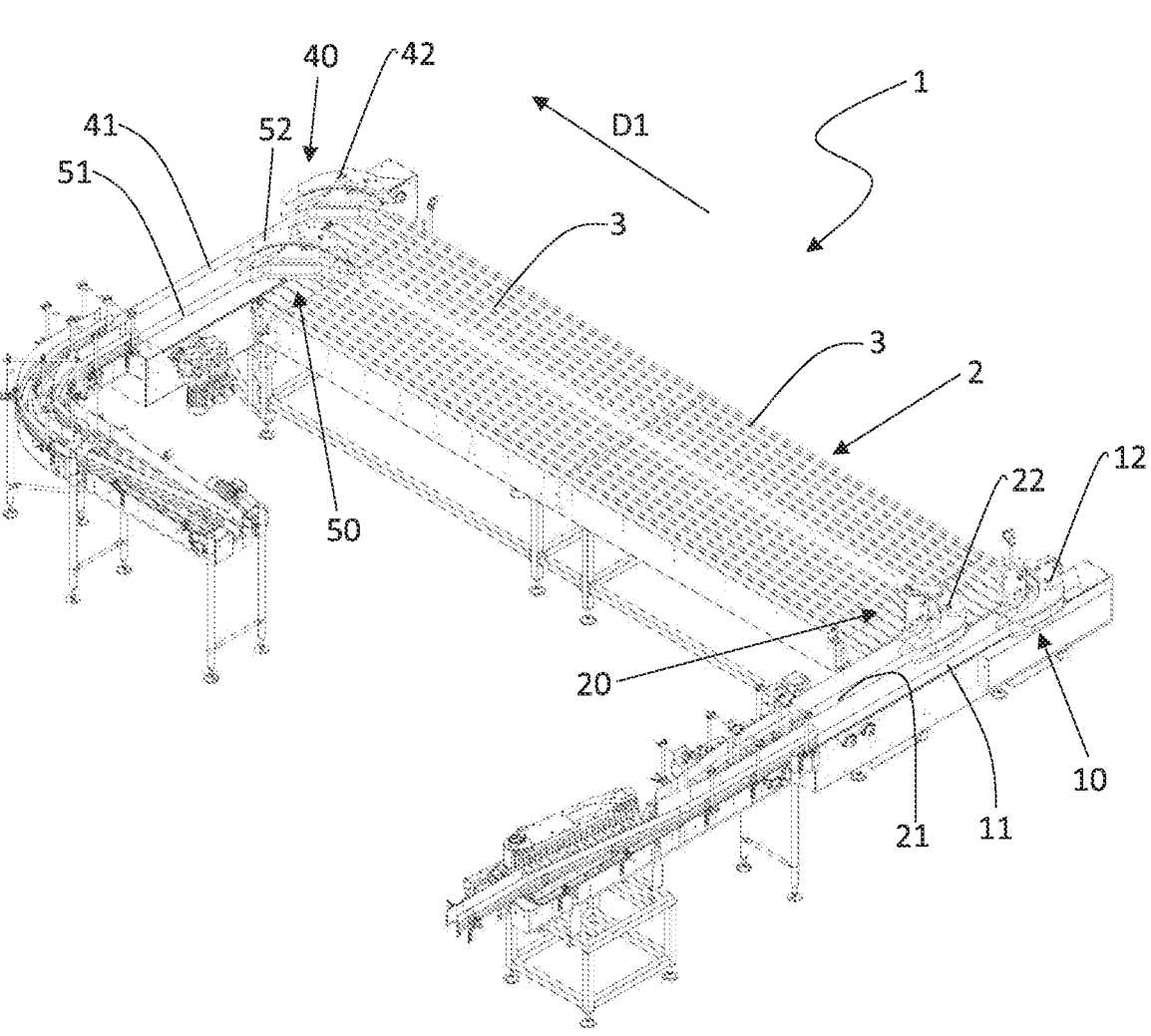
FIG. 1 illustrates an apparatus for transferring and accumulating objects, in perspective view.

In this context, a technical task at the basis of the current disclosure is to propose an apparatus for transferring and accumulating objects and a packaging line which overcome the problems discussed above.

An object of the current disclosure is to provide an apparatus for transferring and accumulating objects, which allows a low cycle time to be maintained without affecting the production yield of the system, regardless of the format of objects or the size of the accumulation table.

Another object of the current disclosure is to propose an apparatus for transferring and accumulating objects, of reduced complexity with respect to the known solutions and capable of responding to the needs of format change without having to increase the components.

The stated technical task and specified objects may be substantially achieved by an apparatus for transferring and accumulating objects, comprising:

at least a first group and a second group of accumulation channels parallel to each other, each accumulation channel having an elongated extension along a direction parallel to an accumulation direction between a loading end and an unloading end of objects, the accumulation channels of the first group having the loading ends aligned with each other, the accumulation channels of the second group having the loading ends aligned with each other;

at least a first and a second transfer device for transferring objects to the accumulation channels, the first transfer device being configured to transfer objects only to accumulation channels of the first group, the second transfer device being configured to transfer objects only to accumulation channels of the second group, the first and the second transfer device receiving at the input objects in turn, i.e., alternatively, wherein the loading ends of the accumulation channels of the first group are misaligned with respect to the loading ends of the accumulation channels of the second group.

In accordance with some embodiments of the current disclosure, the accumulation channels of the first group have the loading ends arranged along a first direction substantially orthogonal to the accumulation direction, and the accumulation channels of the second group have the loading ends arranged along a second direction substantially orthogonal to the accumulation direction.

In some embodiments, the first direction and the second direction are parallel but not coincident.

In some embodiments, the first direction is retracted with respect to the second direction.

In some embodiments, the first and the second transfer device respectively comprise a first and a second lane and a first and a second movable portion respectively associated with the first and the second lane for transferring the objects therefrom to one of the accumulation channels. Preferably, each movable portion has at least one curvilinear section for delivering the objects to one of the accumulation channels.

Each curvilinear section comprises a passage channel for the objects having an extension following the curvilinear profile of the curvilinear section.

In some embodiments, each passage channel is laterally delimited by a pair of motorized belts.

In some embodiments, the distance between the pair of belts is adjustable.

In some embodiments, the apparatus further comprises a conveying device for feeding the objects to the first and the second transfer device.

The conveying device is configured to communicate in turn, i.e., alternatively, with the first and the second transfer device.

In some embodiments, the accumulation channels of the first group have the unloading ends aligned with each other and the accumulation channels of the second group have the unloading ends aligned with each other, the unloading ends of the accumulation channels of the first group are misaligned with respect to the unloading ends of the accumulation channels of the second group.

In some embodiments, the accumulation channels of the first group have the unloading ends arranged along a third direction substantially orthogonal to the accumulation direction, and the accumulation channels of the second group have the unloading ends arranged along a fourth direction substantially orthogonal to the accumulation direction.

The third direction and the fourth direction are parallel but not coincident. In accordance with an embodiment, the third direction is advanced with respect to the fourth direction.

In accordance with an embodiment, the apparatus further comprises a first and a second device for unloading objects from the accumulation channels.

The first unloading device is configured to transfer objects only from the accumulation channels of the first group, while the second unloading device is configured to transfer objects only from the accumulation channels of the second group.

For example, the accumulation channels of the first group have a longer length than the accumulation channels of the second group.

The stated technical task and specified aims are substantially achieved by a packaging line, comprising:

a filling unit, a closing unit and a labelling unit;

at least one apparatus for transferring and accumulating objects, placed downstream of the closing unit.

With reference to the figures, number 1 denotes an apparatus for transferring and accumulating objects.

In this context, the objects can be containers, such as bottles, dispensers, jars, cans.

Alternatively, the objects can also be packages of products, e.g., powdered coffee or tea.

The apparatus 1 comprises a plurality of accumulation channels 3.

In the embodiment described and illustrated herein, the plurality of accumulation channels 3 extends along an accumulation table 2.

Alternatively, the accumulation channels 3 may be part of two or more flanked accumulation tables. Alternatively, the accumulation channels 3 each constitute an independent unit.

Preferably, each accumulation channel 3 has an elongated extension between a loading end 3a and an unloading end 3b.

In the embodiment described and illustrated herein, the accumulation table 2 extends along an accumulation direction D1.

The accumulation channels 3 extend along a plurality of directions parallel to each other and to the accumulation direction D1.

Therefore, the accumulation channels 3 are flanked to each other according to a direction which is orthogonal to the accumulation direction D1 and which, in this context, is indicated as the "flanking direction" of the accumulation channels 3. Such a flanking direction is indicated in the figures with D2.

The apparatus 1 comprises at least a first transfer device 10 and a second transfer device 20 of the objects to the accumulation channels 3. The first and the second transfer device 10, 20 are arranged upstream of the accumulation channels 3.

The first transfer device 10 comprises a first lane 11 and a first movable portion 12 associated with the first lane 11 for transferring objects therefrom to one of the accumulation channels 3.

The first movable portion 12 is movable, in particular sliding, along the first lane 11 so as to be able to be arranged at the loading end 3a of the various accumulation channels 3.

The first lane 11 may be made in a single piece or it may comprise multiple segments arranged one after the other so as to define such a first lane 11.

The second transfer device 20 comprises a second lane 21 and a second movable portion 22 associated with the second lane 21 for transferring objects therefrom to one of the accumulation channels 3.

The second movable portion 22 is movable, in particular sliding, along the second lane 21 so as to be able to be arranged at the loading end 3a of the various accumulation channels 3.

The second lane 21 may be made in a single piece or it may comprise multiple segments arranged one after the other so as to define such a second lane 21.

In the embodiment described and illustrated herein, the first lane 11 and the second lane 21 are flanked. In the embodiment described and illustrated herein, the first movable portion 12 comprises a first loading guide 13 which may be arranged at the loading end 3a of one of the accumulation channels 3 to guide the objects therein. The first movable portion 12 further comprises a first carriage (not illustrated) associated with the first loading guide 13 to move it along the first lane 11.

Likewise, the second movable portion 22 comprises a second loading guide 23 which may be arranged at the loading end 3a of one of the accumulation channels 3 to guide the objects therein. The second movable portion 22 further comprises a second carriage (not illustrated) associated with the second loading guide 23 to move it along the second lane 21.

In particular, the first and the second loading guide 13, 23 are motorized. Each movable portion 12, 22 is arranged and shaped so as to communicate with one of the accumulation channels 3 at a time.

In particular, if at a given time the first movable portion 12 is arranged at the loading end 3a of a predefined accumulation channel 3, the second movable portion 22 cannot simultaneously be at the predefined accumulation channel 3. The second movable portion 22 could instead be, at such a same instant, at the loading end 3a of another accumulation channel 3, different from the predefined accumulation channel 3.

In the embodiment described and illustrated herein, the first lane 11 and the second lane 21 have an elongated extension in two substantially parallel directions, which are the object transport directions.

In some embodiments, the extension directions of the two lanes 11, 21 are transverse to the directions of the accumulation channels 3. Therefore, the extension directions of the two lanes 11, 21 are transverse to the accumulation direction D1.

Preferably, the extension directions of the two lanes 11, 21 are substantially orthogonal to the directions of the accumulation channels 3. Therefore, the extension directions of the two lanes 11, 21 are orthogonal to the accumulation direction D1.

In other words, the extension directions of the two lanes 11, 21 are substantially parallel to the flanking direction D2 of the accumulation channels 3.

In some embodiments, the accumulation table 2 consists of at least two groups of accumulation channels 3, hereinafter referred to as "first group" and "second group".

In particular, the first transfer device 10 is configured to transfer objects only to accumulation channels 3 of the first group, while the second transfer device 20 is configured to transfer objects only to accumulation channels 3 of the second group.

In particular, the loading ends 3a of the accumulation channels 3 of the first group face the first lane 11 and the loading ends 3a of the accumulation channels 3 of the second group face the second lane 21.

In particular, the first movable portion 12, by sliding along the first lane 11, can be arranged at the loading end 3a of one of the accumulation channels 3 of the first group.

In particular, the second movable portion 22, by sliding along the second lane 21, can be arranged at the loading end 3a of one of the accumulation channels 3 of the second group.

The accumulation channels 3 of the first group have the loading ends 3a aligned with each other, i.e., arranged along a first direction g1 which is parallel to the flanking direction D2.

The accumulation channels 3 of the second group have the loading ends 3a aligned with each other, i.e., arranged along a second direction g2 which is parallel to the flanking direction D2.

Originally, the loading ends 3a of the accumulation channels 3 of the first group are misaligned (i.e., offset) with respect to the loading ends 3a of the accumulation channels 3 of the second group.

Therefore, the first direction g1 and the second direction g2 are parallel but spaced apart.

In particular, in the illustrated embodiment, the first alignment direction g1 of the loading ends 3a of the first group extends upstream of the second alignment direction g2 of the loading ends 3a of the second group, with respect to the accumulation direction D1.

In other words, the loading ends 3a of the accumulation channels 3 of the first group are retracted with respect to the loading ends 3a of the accumulation channels 3 of the second group, with reference to the accumulation direction D1.

As already mentioned above, the first transfer device 10 is at the service of the first group of accumulation channels 3, while the second transfer device 20 is at the service of the second group of accumulation channels 3.

In the embodiment described and illustrated herein, the first lane 11 is external with respect to the second lane 21.

In particular, the second lane 21 extends over a shorter length with respect to the first lane 11.

Preferably, both the first loading guide 13 and the second loading guide 23 have at least one curvilinear section 131, 231 for delivering the objects to the accumulation channel 3.

In particular, the two curvilinear sections 131, 231 have counter-shaped surfaces so that, in a configuration of proximity between the first loading guide 13 and the second loading guide 23, such counter-shaped surfaces can come into contact.

In some embodiments, each curvilinear section 131, 231 comprises a passage channel 16 for the objects having an extension following the curvilinear profile of the curvilinear section 131, 231.

In the embodiment described and illustrated herein, each passage channel 16 is laterally delimited by a pair of motorized belts 17. In practice, each belt 17 of the pair defines a lateral abutment for the objects in transit.

For each passage channel 16, the belts 17 act laterally on the objects in transit in the loading guide 13, 23, providing them with the necessary thrust to continue their path towards the corresponding accumulation channel 3.

In fact, without the help of the belts 17, the thrust necessary for the objects to be able to cross the loading guide 13, 23 and reach the accumulation channel 3 should only be imparted by the relative lane 11, 21.

The presence of the belts 17 allows to maintain the orientation even of objects shaped in a non-symmetrical manner, which could rotate if pushed only by the loading lane 11, 21.

Having a pair of belts 17 to define the sides of the passage channel 16 greatly favours the movement of the objects along the loading guide 13, 23.

In an alternative solution, only one lateral belt is used which, although not optimal in the transfer of the objects, still allows to obtain good transfer performance with respect to the total absence of belts.

Preferably, each passage channel 16 has a width which is adjustable as a function of the format of the objects.

In particular, the distance between the pair of belts 17 is adjustable so as to adjust the width of the passage channel 16.

Thereby, the apparatus 1 is easily adaptable to the format change of the objects to be transferred.

The apparatus 1 comprises conveying device 30 for feeding the objects to the transfer devices 10, 20. Therefore, the conveying device 30 is arranged upstream of the transfer devices 10, 20.

The conveying device 30 is configured to communicate in turn, i.e., alternatively, with the first and the second transfer device 10, 20.

Figure 4:
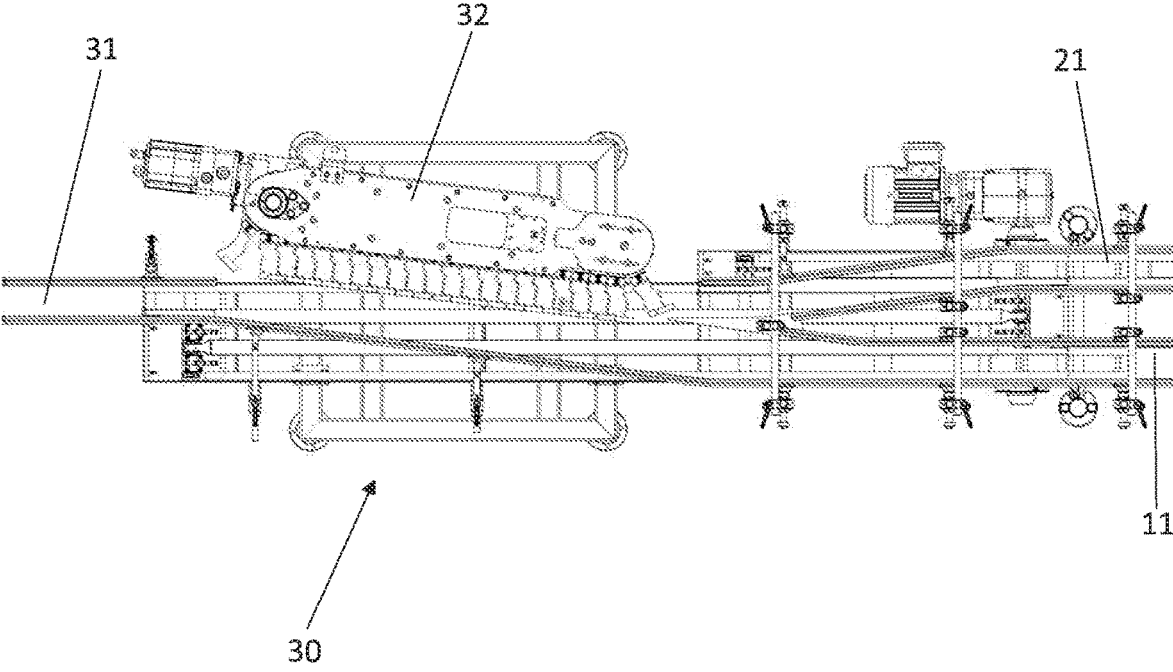
FIG. 4 illustrates a conveying device of the apparatus of FIG. 1.
Figure 5:
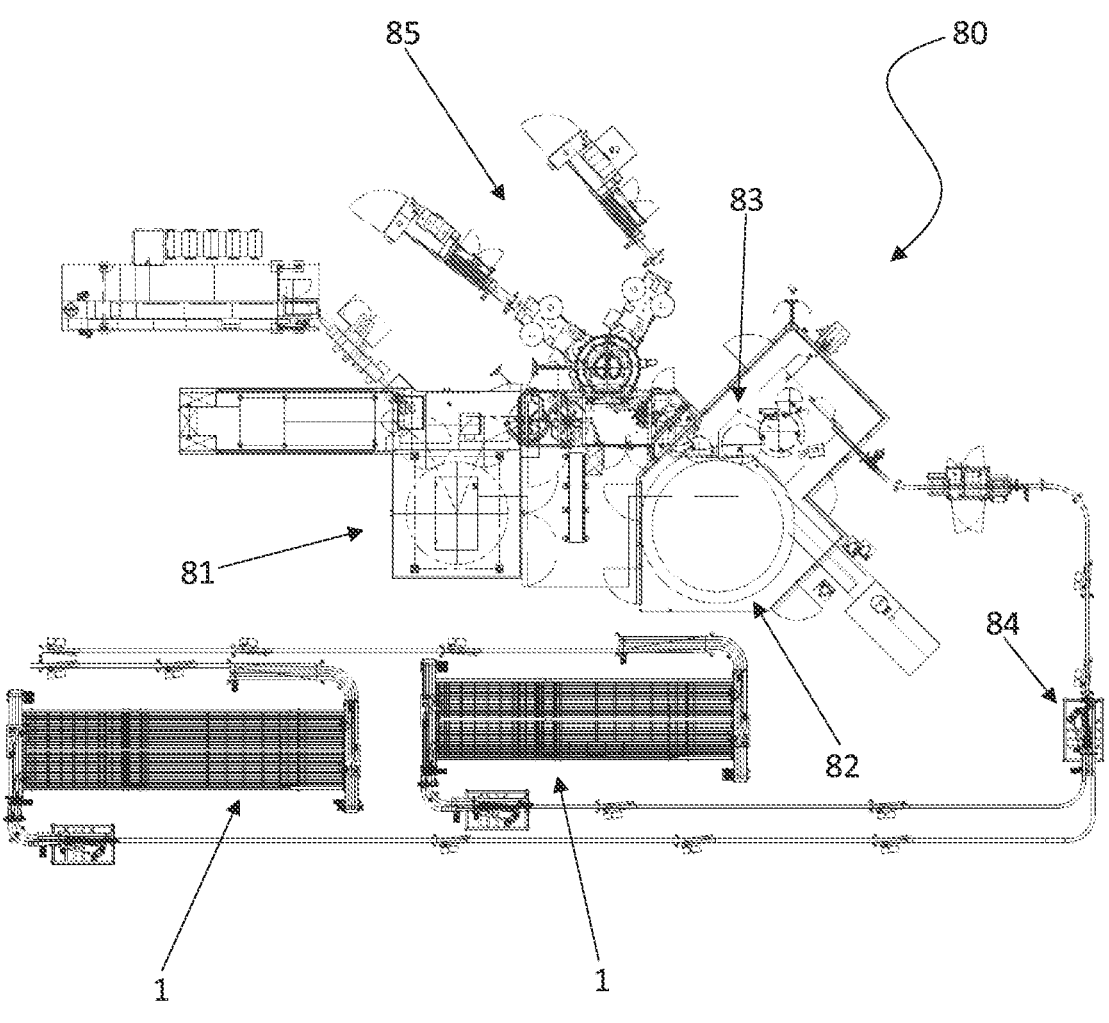
FIGS. 5 and 6 illustrate two different embodiments of a packaging line.
Figure 6:
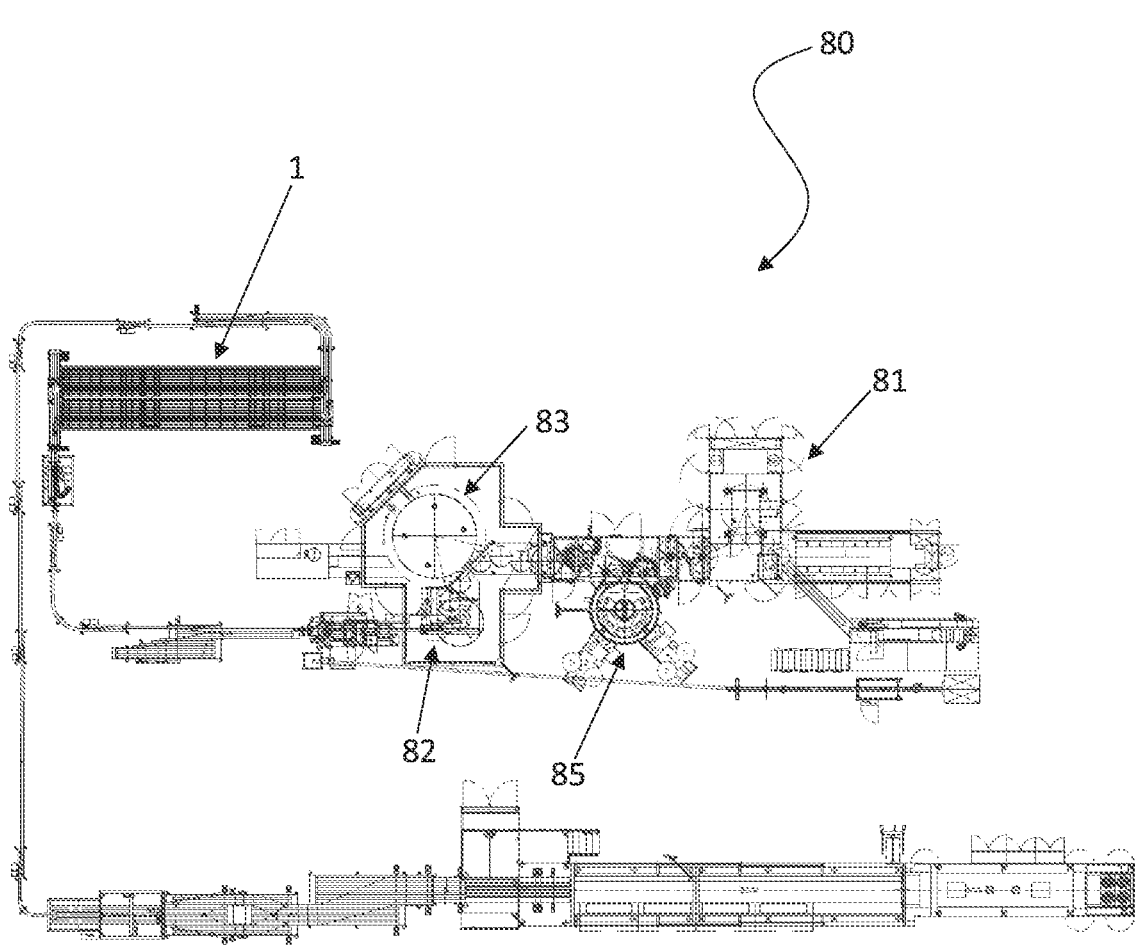

In the embodiment described and illustrated herein (see FIG. 4), the conveying device 30 comprises a single-row conveyor belt 31, in which the objects advance one after the other in a single row, and an alternative divider 32 configured to enable in turn, i.e., alternatively, the communication between the single-row conveyor belt 31 and one of the two transfer devices 10, 20.

It should be noted that when the single-row conveyor belt 31 communicates with, for example, the first transfer device 10, the second transfer device 20 can in no way receive objects from the conveyor belt 31. That is, the communication established by the divider 32 is exclusive.

The first transfer device 10 then selectively communicates upstream with the conveyor belt 31 and downstream with one of the accumulation channels 3.

An apparatus 1 having two transfer devices 10, 20 has been described so far. However, it is understood that the apparatus 1 may also comprise a greater number of transfer devices, as the operating logic does not change. The single-row conveyor belt 31 always communicates with only one transfer device at a time and communicates with all of them in turns.

What was just described on the exclusive operating logic generally applies to the conveying device 30 and not only in the particular embodiment with a single-row conveyor belt 31 and a divider 32.

Preferably, the apparatus 1 comprises a control unit (not illustrated) configured to count the objects transferred from the single-row conveyor belt 31. The control unit is also configured, upon reaching a predetermined number of objects transferred towards one of the transfer devices 10, 20, to operate the divider 32 so as to impose an operating condition on the first transfer device 10, in which a flow of objects slides thereon and simultaneously impose a resting condition on the second transfer device 20, in which the flow of objects is blocked (i.e., does not slide thereon), or vice versa.

The first and/or the second movable portion 12, 22 are moved along the relative lane 11, 21 from one accumulation channel 3 to another only during the resting condition thereof. It is thereby possible to sort the flow of objects without flow interruptions, passing from a (full) channel to a new channel to start filling. In fact, the transfer device 10, 20 which is in the resting condition has all the time to move at another channel without having to interrupt the flow of objects, which are diverted by the other transfer device 10, 20 in the operating condition on the corresponding channel.

That is, the resting condition of a transfer device 10, 20 is not dead time, but time during which the transfer of objects occurs by another transfer device 10, 20.

In particular, the divider 32 is configured to interrupt the communication between the single-row conveyor belt 31 and the first transfer device 10 and enable the communication thereof with the second transfer device 20, upon reaching a predetermined number of objects transferred to the first transfer device 10. That is, the divider 32 is configured to divert the flow of objects towards the other transfer device 10, 20. "Other transfer device" herein means the transfer device 10, 20 which is not receiving the flow of objects.

Preferably, the predetermined number of objects identifies a filled condition of an accumulation channel 3. That is, once the first transfer device 10 has received a sufficient number of objects to fill the accumulation channel 3 with which it is communicating downstream, the divider 32 prevents further objects from reaching the first transfer device 10, diverting them towards the second transfer device 20.

In some embodiments, the divider 32 comprises an abutment element movable between a first engagement position, in which it engages at least in part the first transfer device 10, and a second position, in which it is housed in a seat obtained in the divider 32.

In some embodiments, the abutment element in the first engagement position engages at least in part the first lane 11. Preferably, the first lane 11 is entirely crossed by the abutment element.

In particular, the divider 32 imposes the resting condition on the first transfer device 10 (which corresponds to the imposition of the operating condition on the second transfer device 20), bringing the abutment element from the second engagement position to the first engagement position.

Likewise, the divider 32 imposes the operating condition on the first transfer device 10 (which corresponds to the imposition of the resting condition on the second transfer device 20), bringing the abutment element from the first engagement position to the second engagement position.

Preferably, the abutment element has an engagement surface shaped so as to guide the flow of objects towards the second lane 21.

Alternatively, other dividers of known type can be used which allow the single-row conveyor belt 31 to communicate with only one transfer device 10, 20 at a time.

Preferably, the apparatus 1 comprises a first unloading device 40 and a second unloading device 50 of the objects from the accumulation channels 3. The first and the second unloading device 40, 50 are arranged downstream of the accumulation channels 3.

The first unloading device 40 is configured to transfer objects only from the accumulation channels 3 of the first group, while the second unloading device 50 is configured to transfer objects only from the accumulation channels 3 of the second group.

Preferably, the first unloading device 40 comprises a third lane 41 and a third movable portion 42 associated with the third lane 41 for transferring the objects coming from one of the accumulation channels 3 thereto.

The third movable portion 42 is movable, in particular sliding, along the third lane 41 so as to be able to be arranged at the unloading end 3*b* of the various accumulation channels 3.

The third lane 41 may be made in a single piece or may comprise multiple segments arranged one after the other so as to define such a third lane 41.

Preferably, the second unloading device 50 comprises a fourth lane 51 and a fourth movable portion 52 associated with the fourth lane 51 for transferring the objects coming from one of the accumulation channels 3 thereto.

The fourth movable portion 52 is movable, in particular sliding, along the fourth lane 51 so as to be able to be arranged at the unloading end 3*b* of the various accumulation channels 3.

The fourth lane 51 may be made in a single piece or it may comprise multiple segments arranged one after the other so as to define such a fourth lane 51.

Each movable portion 42, 52 is arranged and shaped so as to communicate with one of the accumulation channels 3 at a time.

In particular, the unloading ends 3*b* of the accumulation channels 3 of the first group face the third lane 41 and the unloading ends 3*b* of the accumulation channels 3 of the second group face the fourth lane 51.

In particular, the third movable portion 42, sliding along the third lane 41, can be arranged at the unloading end 3*b* of one of the accumulation channels 3 of the first group.

In particular, the fourth movable portion 52, sliding along the fourth lane 51, can be arranged at the unloading end 3*b* of one of the accumulation channels 3 of the second group.

Likewise to the logic applied to the transfer devices 10, 20, the first and the second unloading device 40, 50 are controlled so that, when the first one is affected by a flow of objects in output from the accumulation channel 3 with which it is communicating, the second one can be moved at the next accumulation channel 3 which will be emptied, and vice versa.

What is described with reference to the first and second transfer device 10, 20 and its components is to be understood as extended and applicable with the appropriate modifications also to the first and second unloading device 40, 50.

In some embodiments, the accumulation channels 3 of the first group have the unloading ends 3b aligned with each other, i.e., arranged along a third direction g3 which is parallel to the flanking direction D2.

The accumulation channels 3 of the second group have the unloading ends 3b aligned with each other, i.e., arranged along a fourth direction g4 which is parallel to the flanking direction D2.

Originally, the unloading ends 3b of the accumulation channels 3 of the first group are misaligned (i.e., offset) with respect to the loading ends 3b of the accumulation channels 3 of the second group.

Therefore, the third direction g3 and the fourth direction g4 are parallel but spaced apart.

In particular, in the illustrated embodiment, the third alignment direction g3 of the unloading ends 3b of the first group extends downstream of the fourth alignment direction g4 of the unloading ends 3b of the second group, with respect to the accumulation direction D1.

That is, the unloading ends 3b of the accumulation channels 3 of the first group are advanced with respect to the unloading ends 3b of the accumulation channels 3 of the second group, with reference to the accumulation direction D1.

As already mentioned above, the first unloading device 40 is at the service of the first group of accumulation channels 3, while the second unloading device 50 is at the service of the second group of accumulation channels 3.

In some embodiments, the third lane 41 is external with respect to the fourth lane 51.

In particular, the fourth lane 51 extends over a shorter length with respect to the third lane 41.

The accumulation channels 3 of the first group have a longer length than the accumulation channels 3 of the second group.

Alternatively, the accumulation channels 3 of the first group and the second group may have substantially the same length, or those of the second group may have a shorter length than those of the first group.

In some embodiments, the movable portions 12, 22, 42, 52 of the transfer devices 10, 20 and the unloading devices 40, 50 are substantially the same.

In some embodiments, the unloading ends 3b of the accumulation channels 3 of the two groups are all aligned.

Figure 2:
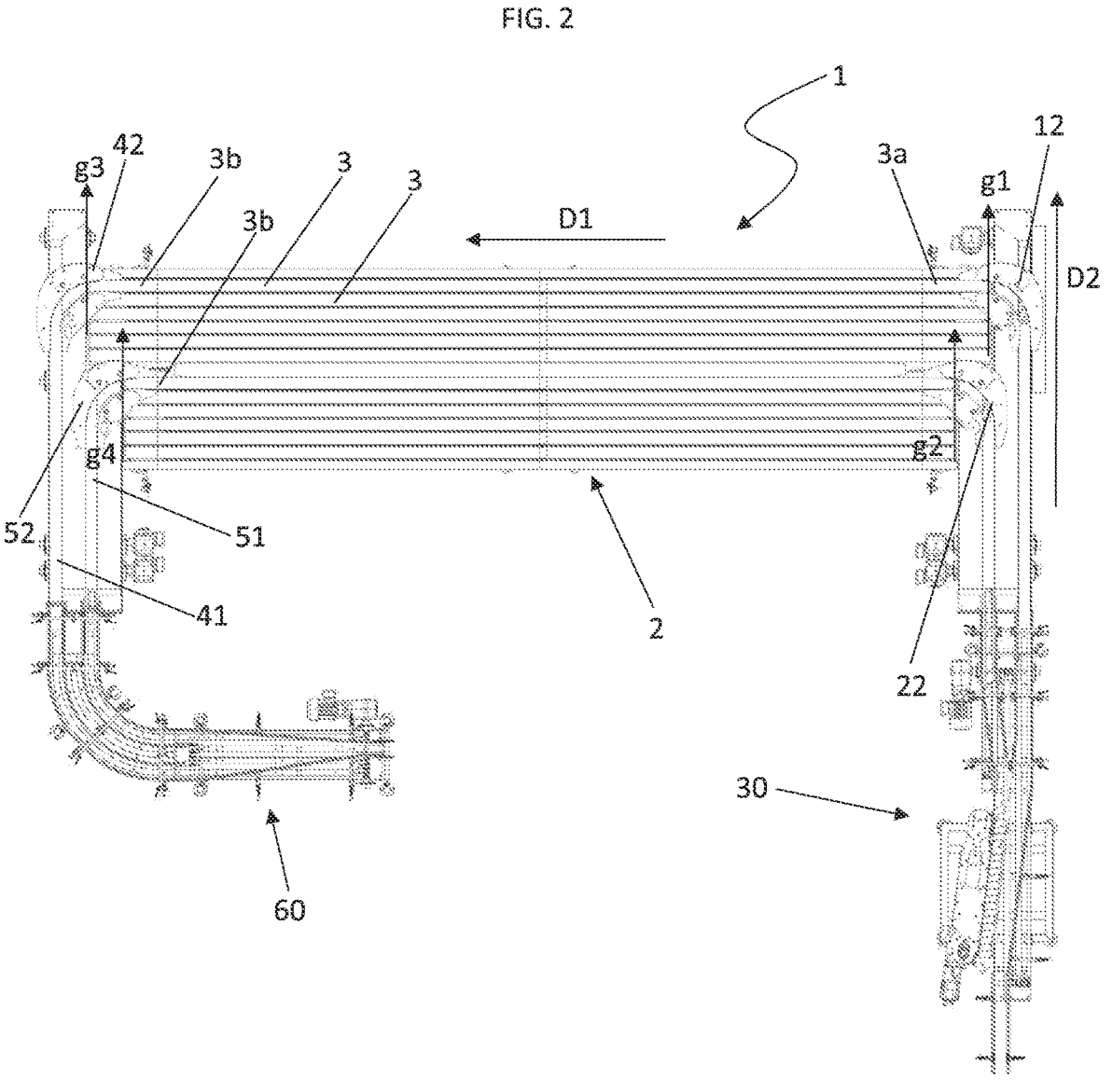
FIG. 2 illustrates the apparatus of FIG. 1, in plan view.
Figure 3:
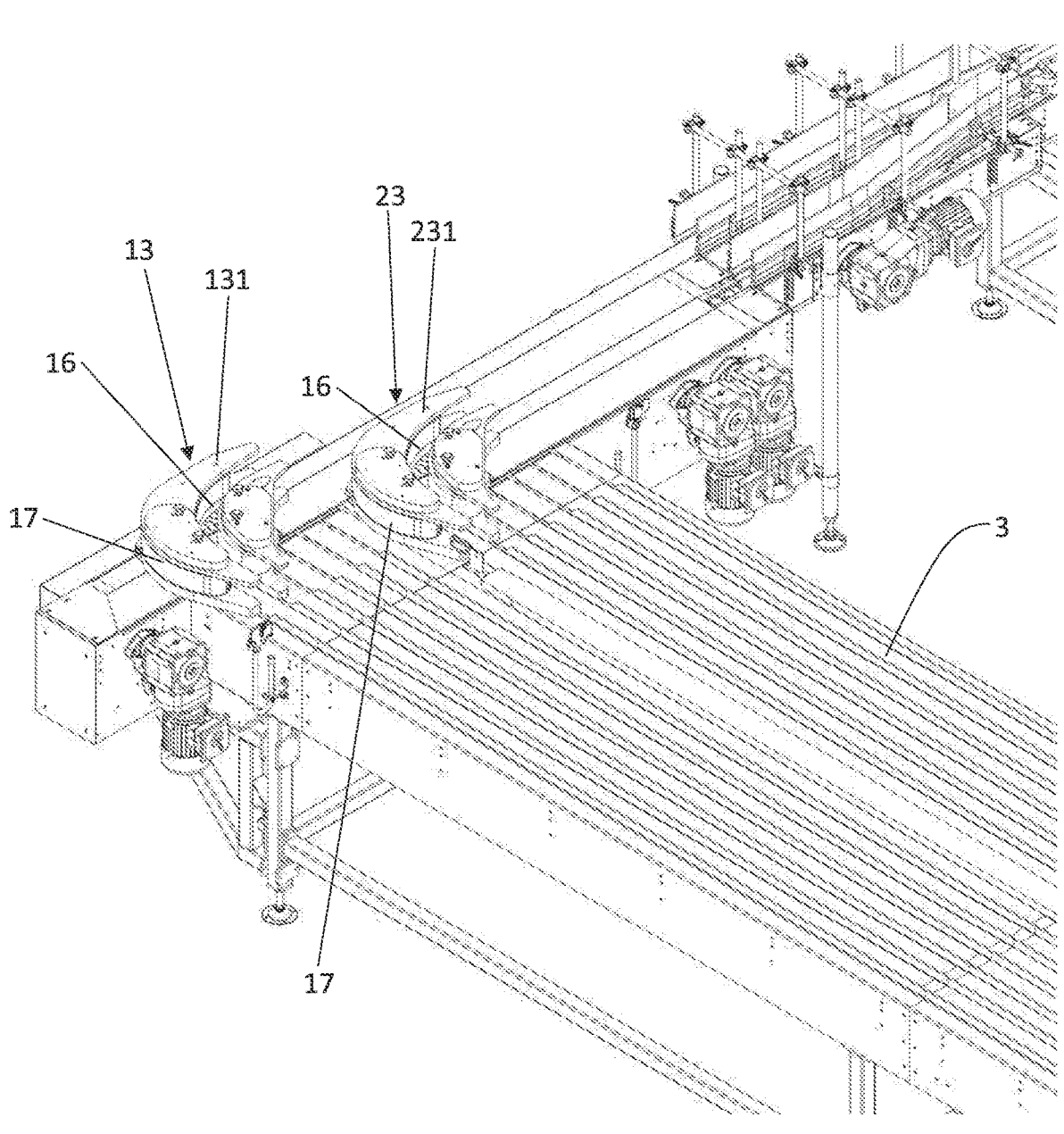
FIG. 3 illustrates transfer devices of the apparatus of FIG. 1.

In some embodiments, illustrated in FIGS. 1-2, the apparatus 1 comprises a device for gathering 60 the objects on a single row. The gathering device 60 communicates upstream with the third and the fourth lane 41, 51.

Figure 7:
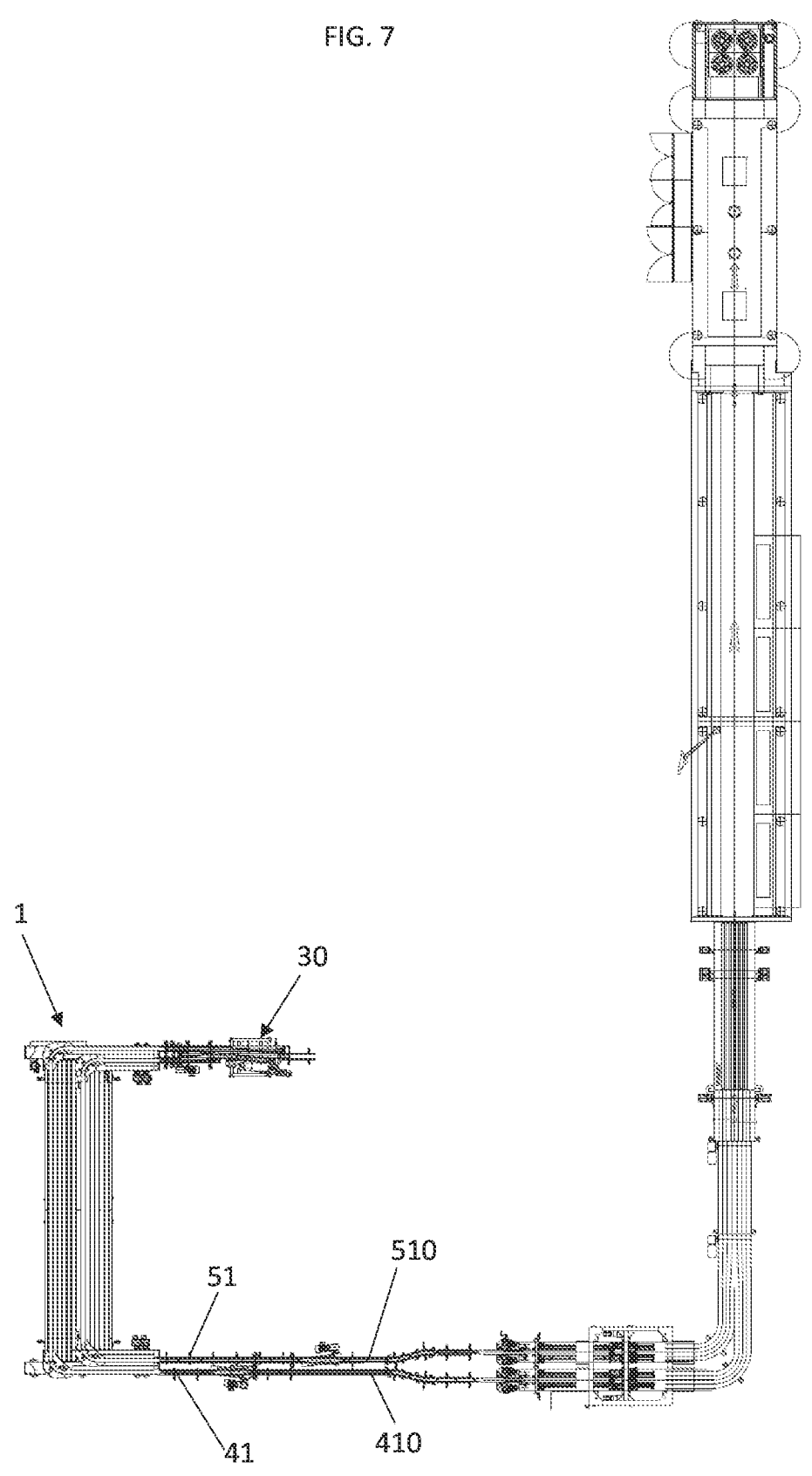
FIG. 7 illustrates a further embodiment of the apparatus of FIG. 2, in plan view.

In some embodiments, illustrated in FIG. 7, the flow of objects in output on the third and fourth lane 41, 51 remains separate. Thus, two independent rows 410, 510 (and therefore two flows) are kept in output.

This, in addition to ensuring a decrease in the unloading speed, with consequent smoother operation of the production line, allows the downstream unit to be better served, if it needs multi-channel feeding. Bringing a multiple-row production back to a single row, and then having to split it again, is thus avoided.

Figure 8:
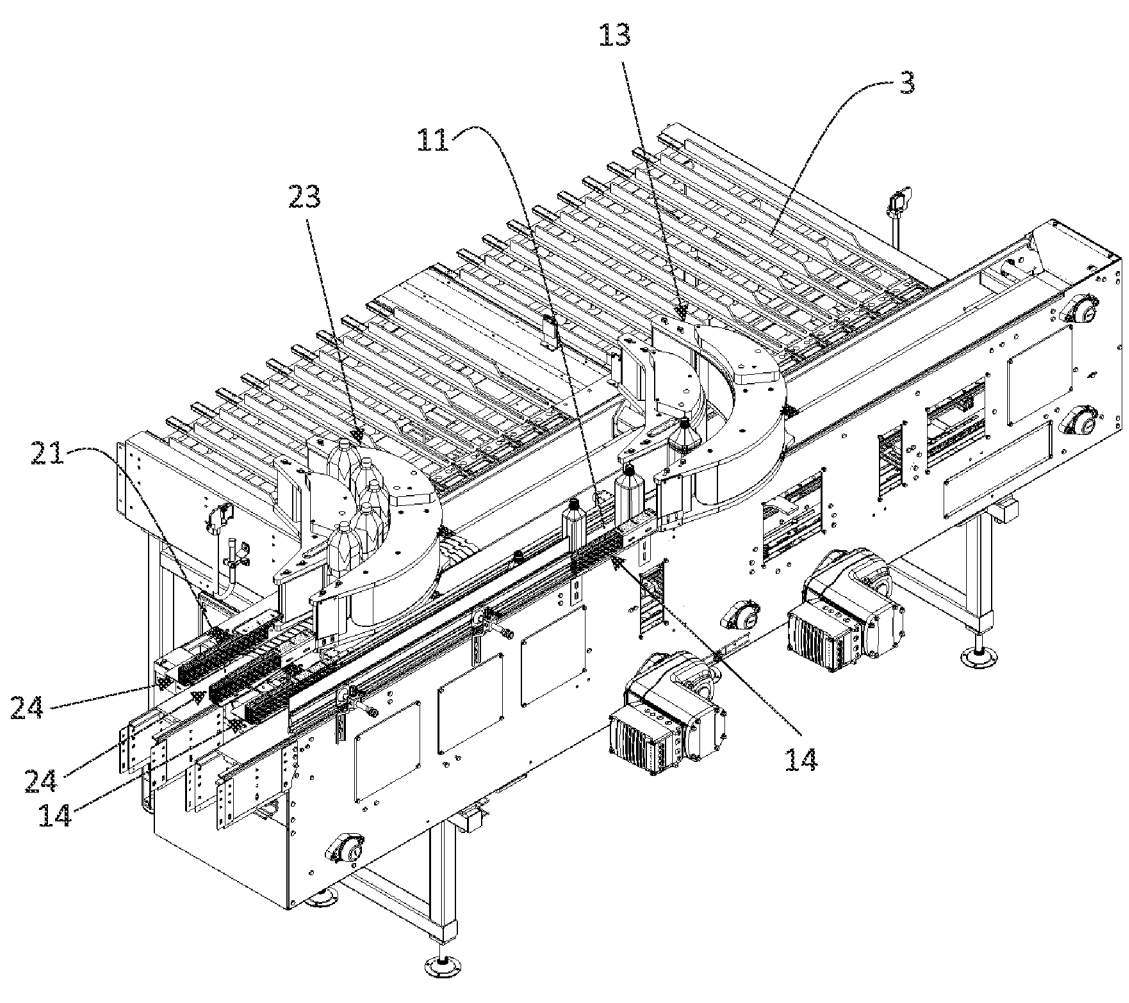
FIGS. 8 and 9 illustrate an embodiment of transfer devices of the apparatus of FIG. 1, in two different operating configurations.
Figure 9:
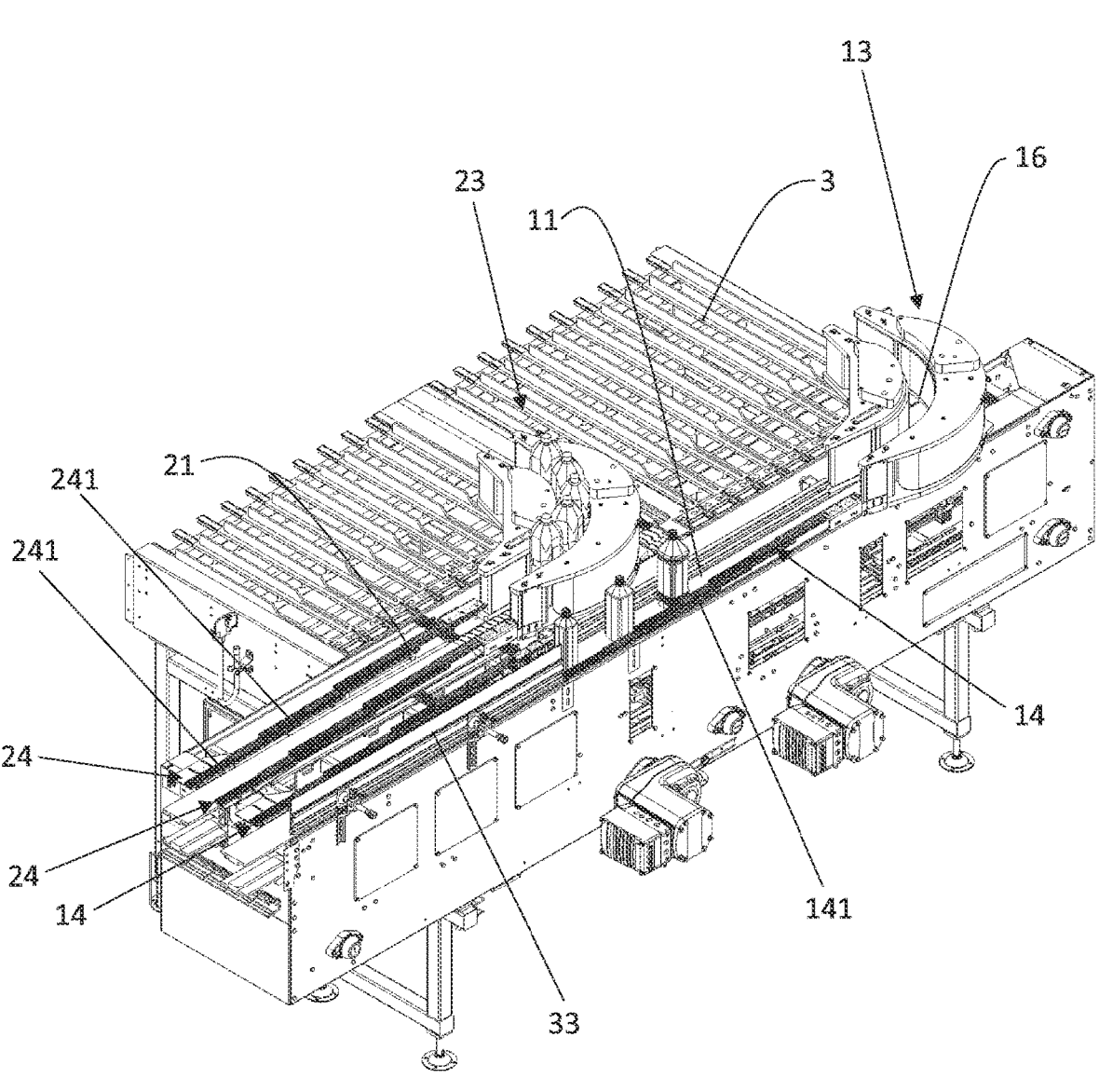

In some embodiments, illustrated in FIGS. 8 and 9, the first transfer device 10 comprises a first pair of telescopic guides, indicated with the number 14.

The first pair of telescopic guides 14 is associated with the first lane 11.

In particular, the first pair of telescopic guides 14 comprises two telescopic guides 14 which are configured to delimit the first lane 11 on two opposite sides. In other words, the two telescopic guides 14 of the first pair are lateral guides for the first lane 11.

The two telescopic guides 14 of the first pair are configured to extend telescopically in a direction parallel to the flanking direction D2.

In one example, the two telescopic guides 14 of the first pair are configured to extend away from the first loading guide 13 towards the conveying device 30.

In another example, the two telescopic guides 14 of the first pair are configured to extend away from the conveying device 30 towards the first loading guide 13.

Each telescopic guide 14 of the first pair comprises a plurality of elements 141 which can be made to slide with respect to each other so as to pass from a fully retracted configuration to a fully extracted configuration of the telescopic guide 14.

In some embodiments, illustrated in FIGS. 8 and 9, the elements 141 are plate-shaped segments slidably mounted with respect to each other.

In the fully retracted configuration illustrated in FIG. 8, the plate-shaped segments 141 of the telescopic guide 14 are arranged substantially flanked.

In the fully extracted configuration, illustrated in FIG. 9, the plate-shaped segments 141 of the telescopic guide 14 extend away from the first loading guide 13 so as to delimit the first lane 11 substantially up to a pair of fixed guides 33.

In some embodiments, the elements 141 that make up the telescopic guides 14 are coaxial tubular elements slidably mounted one inside the other.

In the fully retracted configuration, the tubular elements 141 of the telescopic guide 14 are substantially arranged one inside the other at the pair of fixed guides 33.

In the fully extracted configuration, the tubular elements 141 of the telescopic guide 14 extend starting from the pair of fixed guides 33 and away therefrom so as to delimit the first lane 11 substantially up to the first loading guide 13. In particular, the tubular elements 141 of the two telescopic guides 14 substantially reach the sides of the input of the passage channel 16 of the first loading guide 13.

The function of the first pair of telescopic guides 14 is to guide the advancement of the objects in the transfer from the conveying device 30 to the first loading guide 13 along the first lane 11.

In fact, the objects are accompanied by the telescopic guides 14 of the first pair that extend during the advancement of the objects themselves along the first lane 11. In this way, unwanted drifts of the objects during advancement along the first lane 11 are avoided, especially when the speeds are high.

Similarly, the second transfer device 20 also comprises a second pair of telescopic guides, indicated with number 24.

The second pair of telescopic guides 24 is associated with the second lane 21.

In particular, the second pair of telescopic guides 24 comprises two telescopic guides 24 which are configured to delimit the second lane 21 on two opposite sides. In other words, the two telescopic guides 24 of the second pair are lateral guides for the second lane 21.

The two telescopic guides 24 of the second pair are configured to extend telescopically in a direction parallel to the flanking direction D2.

The two telescopic guides 24 of the second pair are therefore parallel to the two telescopic guides 14 of the first pair.

In some embodiments, the two telescopic guides 24 of the second pair are configured to extend away from the second loading guide 23 towards the conveying device 30.

In some embodiments, the two telescopic guides 24 of the second pair are configured to extend away from the conveying device 30 towards the second loading guide 23.

Each telescopic guide 24 of the second pair comprises a plurality of elements 241 which can be made to slide with respect to each other so as to pass from a fully retracted configuration to a fully extracted configuration of the telescopic guide 24.

In some embodiments, illustrated in FIGS. 8 and 9, the elements 241 are plate-shaped segments slidably mounted with respect to each other.

In the fully retracted configuration, illustrated in FIG. 8, the plate-shaped portions 241 of the telescopic guide 24 are arranged substantially flanked at the beginning of the second loading guide 23.

In the fully extracted configuration, illustrated in FIG. 9, the plate-shaped portions 241 of the telescopic guide 24 extend away from the second loading guide 23 so as to delimit the second lane 21.

In one embodiment variant (not illustrated) the elements 241 that make up the telescopic guides 24 are coaxial tubular elements slidably mounted one inside the other.

In the fully retracted configuration, the tubular elements 241 of the telescopic guide 24 are substantially arranged one inside the other at a further pair of fixed guides (not illustrated).

In the fully extracted configuration, the tubular elements 241 of the telescopic guide 24 extend starting from the pair of fixed guides and away therefrom so as to delimit the second lane 21 substantially up to the second loading guide 23. In particular, the tubular elements 241 of the two telescopic guides 24 substantially reach the sides of the input of the passage channel 16 of the second loading guide 23.

The function of the second pair of telescopic guides 24 is similar to that of the first pair, i.e. it is a function of guiding the advancement of the objects in the transfer from the conveying device 30 to the second loading guide 23 along the first lane 21.

The structure of telescopic guides described for loading the objects in the apparatus 1 can also be repeated for unloading the objects from the apparatus 1.

In some embodiments, the first unloading device 40 comprises a first pair of telescopic guides associated with the third lane 41.

The second unloading device 50 comprises a second pair of telescopic guides associated with the fourth lane 51.

The telescopic guides of the first and second unloading devices 40, 50 are configured to extend telescopically in a direction parallel to the flanking direction D2.

In some embodiments, the telescopic guides of the unloading devices 40, 50 are configured to extend away from the corresponding movable portions 42, 52 toward gathering device 60.

In some embodiments, the two telescopic guides of the unloading devices 40, 50 are configured to extend away from the gathering device 60 towards the corresponding movable portions 42, 52.

The telescopic guides of the unloading devices 40, 50 may comprise a plurality of tubular elements or plate-shaped portions, in analogy to what is described for the telescopic guides of the transfer devices 10, 20.

The function of the telescopic guides of the unloading devices is to guide the advancement of the objects exiting the unloading guides along the third lane 41 and the fourth lane 51.

A packaging line 80 is described below.

The packaging line 80 (hereinafter briefly "line") comprises an apparatus 1 for transferring and accumulating objects as described above.

The line 80 further comprises a filling unit 82, followed by a closing unit 83.

The line 80 further comprises a labelling unit 85.

As a function of the specific application, the filling unit 82 may comprise a filling machine or a dosing unit.

In the event of bottling containers made of thermoplastic material, the line 80 further comprises a blower 81 upstream of the filling unit 82.

The closing unit 85 may be a capper or a capsule applying machine, as a function of the type of container.

In some embodiments, the line 80 comprises two apparatuses 1 arranged parallel. The line 80 comprises a flow dividing device 84 arranged downstream of the closing unit 83 and upstream of the apparatus 1.

Thereby, the flow of objects is shared on the two apparatuses 1, each of which operates according to the described logic. This solution is particularly suitable for high speeds.

In some embodiments, an apparatus 1 such as the one proposed can be arranged between the closing unit 83 and the labelling unit 85.

In this case, the apparatus 1 is used in the embodiment with the gathering device 60 downstream.

In some embodiments, the line 80 further comprises a packaging machine or a cartoning machine (not shown) downstream of the apparatus 1.

In some embodiments, an apparatus 1 may be located between the labelling unit 85 and the packaging/cartoning machine.

In some embodiments, the apparatus 1 is used in the embodiment with two separate rows in output (as in FIG. 7).

The features of the apparatus for transferring and accumulating objects and the packaging line according to the present invention emerge clearly from the above description, as do the advantages.

In particular, having organized the accumulation channels into two different misaligned groups allows the same components to be used for both transfer paths.

In fact, if the loading ends of the accumulation channels were all aligned, it would be necessary to create different types of movable portions for the two lanes, since the distance to be covered between the first lane and accumulation channels would be different from that between the second lane and accumulation channels.

Thereby, it is instead possible to use identical movable portions for the various lanes in the apparatus.

Furthermore, the presence of a motorized belt in the transfer channel allows to assist the objects in transit towards the accumulation channel. The provision of two lateral belts also allows to simultaneously guide and push the objects in transit towards the accumulation channel, preventing them from changing orientation.

Furthermore, the width adjustability of the transfer channel increases the versatility of the apparatus, as it can be used in lines which include multiple object formats.

Furthermore, the presence of more than one apparatus in the bottling line allows to manage even high speeds, without having to increase the accumulation channels present in an apparatus.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. An apparatus for transferring and accumulating objects, comprising:

at least a first group and a second group of accumulation channels parallel to each other, each accumulation channel having an elongated extension along a direction parallel to an accumulation direction between a loading end and an unloading end of objects, the accumulation channels of the first group having the loading ends aligned with each other, the accumulation channels of the second group having the loading ends aligned with each other; and at least a first and a second transfer device for transferring objects to said accumulation channels, said first transfer device being configured to transfer objects only to accumulation channels of the first group, said second transfer device being configured to transfer objects only to accumulation channels of the second group, said first transfer device and said second transfer device receiving objects in an alternating manner, wherein the loading ends of the accumulation channels of the first group are misaligned with respect to the loading ends of the accumulation channels of the second group, and wherein the accumulation channels of the first group have the unloading ends aligned with each other and the accumulation channels of the second group have the unloading ends aligned with each other, said unloading ends of the accumulation channels of the first group being misaligned with respect to the unloading ends of the accumulation channels of the second group.

2. The apparatus according to claim 1, wherein the accumulation channels of the first group have the loading ends arranged along a first direction substantially orthogonal to the accumulation direction and the accumulation channels of the second group have the loading ends arranged along a second direction substantially orthogonal to the accumulation direction, said first direction and said second direction being parallel but not coincident.

3. The apparatus according to claim 1, wherein said at least a first and a second transfer device respectively comprise a first and a second lane and a first and a second movable portion respectively associated with the first and the second lane for transferring the objects therefrom to one of the accumulation channels.

4. The apparatus according to claim 3, wherein each movable portion has at least one curvilinear section for delivering the objects to one of the accumulation channels, each curvilinear section comprising a passage channel for the objects having an extension following a curvilinear profile of the curvilinear section.

5. The apparatus according to claim 4, wherein each passage channel is laterally delimited by a pair of motorized belts.

6. The apparatus according to claim 5, wherein a distance between the pair of belts is adjustable.

7. The apparatus according to claim 3, wherein the first transfer device comprises a first pair of telescopic guides associated with the first lane and the second transfer device comprises a second pair of telescopic guides associated with the second lane.

8. The apparatus according to claim 7, wherein said first pair of telescopic guides and said second pair of telescopic guides are configured to extend telescopically in a direction parallel to a flanking direction.

9. The apparatus according to claim 7, wherein said first pair of telescopic guides and said second pair of telescopic guides are configured to extend away from the first and the second movable portion.

10. The apparatus according to claim 1, comprising a conveying device configured to feed the objects to the first and the second transfer device, said conveying device being configured to communicate in an alternating manner with the first and the second transfer device.

11. The apparatus according to claim 1, wherein the accumulation channels of the first group have the unloading ends arranged along a third direction substantially orthogonal to the accumulation direction and the accumulation channels of the second group have the unloading ends arranged along a fourth direction substantially orthogonal to the accumulation direction, said third direction and said fourth direction being parallel but not coincident.

12. The apparatus according to claim 1, comprising at least a first and a second unloading device of objects from said accumulation channels, said first unloading device being configured to transfer objects only from the accumulation channels of the first group, said second unloading device being configured to transfer objects only from the accumulation channels of the second group.

13. The apparatus according to claim 1, wherein the accumulation channels of the first group have a longer length than the accumulation channels of the second group.

*    *    *    *    *